June 11, 1940.  E. D. McARTHUR ET AL  2,204,423
DISCHARGE DEVICE
Original Filed March 31, 1937
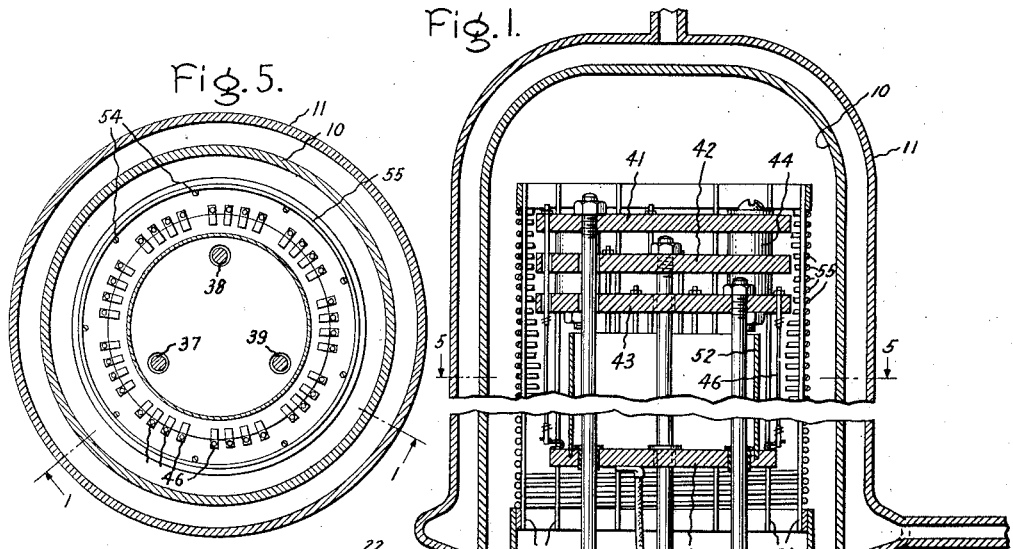
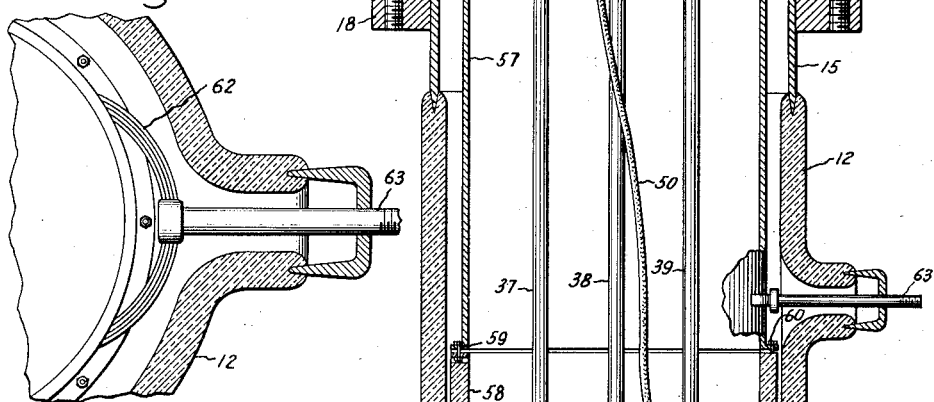
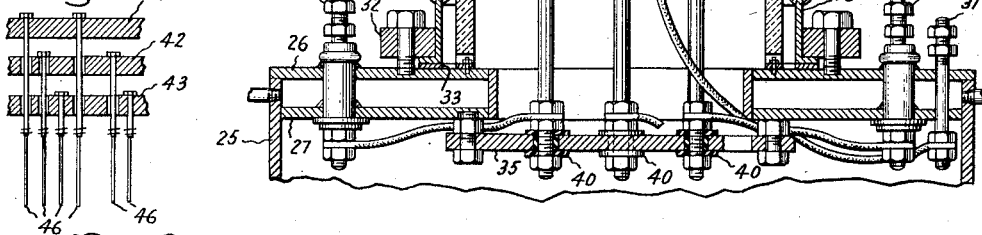
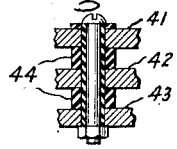
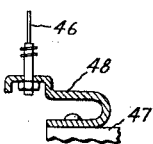
Inventors:
Elmer D. McArthur,
Hobart E. Rowe,
by Harry E. Dunham
Their Attorney.

UNITED STATES PATENT OFFICE 2,204,423

DISCHARGE DEVICE

Elmer D. McArthur, Schenectady, N. Y., and Hobart E. Rowe, Pittsfield, Mass., assignors to General Electric Company, a corporation of New York Original application March 31, 1937, Serial No. 134,046. Divided and this application June 30, 1938, Serial No. 216,734

2 Claims. (Cl. 250—27.5)

This application relates to electric discharge devices and is a division of our co-pending application Serial No. 134,046 filed March 31, 1937.

It is an object of the invention to provide an improved cathode of the multifilament type and more especially an improved relationship between such a cathode and a control grid structure.

The novel features which we desire to protect herein are pointed out in the appended claims. The invention itself, however, may best be understood by reference to the following description taken in connection with the drawing, in which Fig. 1 comprises a longitudinal section of a device suitably embodying the invention; Figs. 2 to 4 are enlarged fragmentary sections illustrating certain details of the cathode structure of Fig. 1; Fig. 5 is a transverse section taken on line 5—5 of Fig. 1; and Fig. 6 is an enlarged detail of the contact means provided for the control grid.

Referring more particularly to Fig. 1, the invention is shown as being applied in connection with a demountable vacuum tube such as is fully described and claimed in our application S. N. 134,046, above referred to. The envelope of the tube comprises a metal portion 10 which is surrounded by an external jacket 11, and an insulating portion 12. The portion 10 constitutes the tube anode of the tube and is cooled by passing water or other fluid through the annular space which surrounds it.

The insulator 12 comprises a glass sleeve which is provided at each end with an annular metal ring sealed into the glass, these rings being numbered 15 and 16 respectively. A vacuum-tight connection between the anode and the insulating portion of the envelope is made by means of a clamped joint between a flange 17 secured to the anode structure and a flange 18 secured to the ring 15. The joint is sealed by means of a thin deformable gasket 20 which is compressed by means of bolts 22 and clamping rings 23.

The envelope is supported on a base structure which is shown as comprising an enlarged enclosure which extends laterally beyond the contour of the envelope and which may connect with an evacuating system (not shown). This enclosure has a lateral wall 25 and an upper wall comprising spaced plates 26 and 27. These plates provide a mounting surface for terminals 29, 30 and 31 which are associated with the various internal electrodes of the tube. The space between the plates is adapted to receive a fluid for cooling the plates and the parts associated therewith. A demountable joint including a clamping ring 32 and a gasket 33 serves to secure the envelope to the plate 26.

The cathode structure shown in the drawing is intended to be heated from a polyphase source of power. It is supported on a metal base plate 35 which is suitably secured to the upper wall of the enlarged enclosure. Direct support for the cathode is provided by means of three upright supporting members 37, 38 and 39 extending longitudinally of the envelope. These members are insulated from one another and from the metallic casing by insulating sleeves 40 provided for that purpose.

At the top of each support there is provided a conducting mount, these mounts taking the form of superimposed plates 41, 42 and 43 respectively. The mounts are insulated from one another by insulating spacers 44 (illustrated in section in Fig. 2) and each mount is provided with a plurality of symmetrically arranged removable filaments 46 suspended therefrom (Fig. 3). Each filament is electrically connected to only one mount and the arrangement is such that each mount supports the same number of filaments.

In order to secure optimum cooperation with the control electrode structure, we further prefer to arrange the filaments in a plurality of spaced groups corresponding in number to the vertical stay-rods employed in the grid construction. This feature, which will be more fully explained in connection with the detailed description of the grid structure, is illustrated in Fig. 3 in which a complete group of four filaments is shown in its relation to the first members of an adjacent group. It will be noted that each third filament is connected to the same mounting plate thus assuring a symmetrical distribution of the polyphase heating currents and the avoidance of a commercial frequency hum in the tube output.

At their lower ends all of the filaments are electrically and mechanically connected to a common conducting member 47 which is freely movable longitudinally of the vertical supports and which thereby operates through gravity to maintain the filaments under tension. Tension between the individual filaments is equalized by means of individual resilient tensioning means attached to each of the filaments, such tensioning means being shown in detail in Fig. 4. The particular means there illustrated comprises a leaf spring 48 connected both to the conducting member 47 and to a filament 46.

Each of the various mounts may be separately connected to one phase of a polyphase source of potential through its corresponding supporting member. An externally accessible terminal for each of the supporting members is provided by means of a vacuum-tight lead-in connection established through the upper headers 26 and 27 of the enlarged enclosure. A common return for the currents of all of the various filaments is provided by means of a wire 50 connecting with the suspended conducting member 47. The wire 50 may be grounded to the metal casing, but it is preferred also to provide a directly connected externally accessible terminal 31. The provision of such a terminal avoids the necessity of passing the radio frequency currents through the casing structure where they might be unduly attenuated.

Due to the relatively great dimensions of the hollow space enclosed by the filaments of the illustrated cathode construction, stray electrons passing diametrically across the space from one filament to another may traverse a distance much greater than the normal path from the filament to the anode. The ionization resulting from collisions between electrons and gas molecules under these conditions may be such as seriously to interfere with the normal operation of the device. In order to avoid this difficulty we provide within the cathode an ionization shield in the form of a hollow conducting cylinder 52 (Fig. 1), this cylinder being electrically connected to the conducting member 47 and through this to the cathode filaments. The spacing of the shield from the filaments is preferably made less than the length of the normal path from the cathode to the anode, whereby electrons will be intercepted before they have traversed a sufficient distance to cause appreciable ionization.

The grid structure illustrated comprises a plurality of vertical stay-rods 54 having transverse grid wires 55 mounted thereon. The grid wires are shown in enlarged scale in the drawing and are actually of much smaller diameter than the stay-rods. They may be wound helically on the stay-rods or applied in any other appropriate fashion.

It is found that in a tube of high power capacity such as that shown, the collection of current by the grid stay-rods may be excessive with the arrangements ordinarily employed. In order to overcome this difficulty we dispose the stay-rods so that they fall between the groups of filaments. This arrangement, which is most clearly illustrated in Fig. 5, is advantageous in that the stay-rods are outside of the principal paths of current flow from the cathode to the anode and, consequently have little effect on it. As a result control of the current passing from the cathode to the anode is accomplished principally by the transversely extending grid wires, and a substantially smaller part of the total current is intercepted by the stay-rods. (While the grid wires are shown in the drawing as being partly broken away, it will be understood that this is only to simplify the illustration.)

The grid structure as a whole is supported on an intermediate cylinder 57 which in turn is supported independently of the envelope and adjacent its open end by means of an insulator 58 mounted on the plate 26. An adjustable connection including screws 59 and 60 is provided between the cylinder 57 and the insulator 58 to permit proper alinement of the grid with respect to the cathode. In order that the envelope may be removed without requiring removal of the grid, the grid is connected to an external source of potential by a frictional contact which is adapted to be disengaged as an incident of the removal of the envelope. In the particular arrangement shown (Fig. 6) this contact comprises a series of arcuate leaf springs 62 resiliently engaging the outer surface of the metal cylinder 57. These springs are supported at the inner extremity of a lead-in conductor 63 which is sealed in a vacuum-tight manner through the wall of the insulating envelope portion 12.

While we have in the foregoing referred to a particular structural embodiment of our invention, it will be understood that numerous modifications may be made by those skilled in the art without departing from the invention. We, therefore, aim to cover in the appended claims, all such variations as fall within the true spirit and scope of the foregoing disclosure.

What we claim as new and desired to secure by Letters Patent of the United States, is:

1. A vacuum discharge device including an evacuated envelope, a cathode within said envelope comprising electron emissive elements arranged to form a hollow structure, an anode surrounding the cathode, the diameter of said structure being substantially greater than the length of the normal path from the cathode to the anode, and a generally cylindrical conducting member within the structure for substantially preventing ionization therein, said conducting member being electrically connected to the cathode and being spaced from said elements a distance substantially less than the length of the normal path from the cathode to the anode.

2. A vacuum discharge device including an evacuated envelope, a cathode within said envelope comprising a plurality of electron emissive filaments arranged to form a hollow cylindrical structure, a cylindrical anode concentrically surrounding said cathode, the distance between the anode and the cathode filaments being materially less than the diameter of the said cathode structure, and means comprising a hollow tubular conducting member within said cathode structure for preventing the occurrence of ionization therein, said conducting member being electrically connected to the cathode structure and being spaced from the various cathode filaments a distance on the order of or less than the distance from such filaments to the anode.

ELMER D. McARTHUR.
HOBART E. ROWE.